ELECTRO-EROSION MACHINERY

Filed Aug. 9, 1968

INVENTOR
Gordon Victor Smith
BY
Shoemaker and Mattare
ATTORNEYS 3,538,291

ELECTRO-EROSION MACHINERY

Gordon V. Smith, Highnam, England, assignor to Sparcatron Limited, Gloucester, England a British company Filed Aug. 9, 1968, Ser. No. 751,408
Claims priority, application Great Britain, Aug. 23, 1967, 38,788/67
Int. Cl. B23p *1/08*
U.S. Cl. 219—69 5 Claims

ABSTRACT OF THE DISCLOSURE

Electro-erosion apparatus wherein pulsed discharges are generated by a multi-vibrator circuit incorporating a pair of transistors, the collector of each transistor being cross-coupled by means of a capacitance with the base of the other transistor and an adjustable resistance being associated with each transistor, the resistance being coupled to the base electrode of the associated transistor by an impedance buffer.

This invention relates to electro-erosion machines for cutting or working electrically conductive materials, such as hard metals and tool steels.

Most current modern electro-erosion machines operate by means of supplying unidirectional pulsed discharges between a tool electrode and a workpiece in the presence of a dielectric fluid. The pulsed discharges are derived from the power supply by periodically rendering conductive an electronic switch which is in series circuit with the spark gap and the power supply, this electronic switch being periodically rendered conductive by an actuating device which may be in the form of a multivibrator in circuit with an amplifying means, the latter delivering timed actuating pulses to the said electronic switch. The pulses are desirably as nearly rectangular as possible and the multivibrator or similar actuating device is equipped with means for adjusting the frequency of the output pulses and for adjusting the ON/OFF ratio of the output pulses. By these adjustment means the duration of each discrete pulsed discharge across the gap between the tool electrode and the workpiece can be adjusted at various repetition frequencies.

During each working discharge the gap is ionized. If the gap remains ionized an arc would be formed between the tool electrode and the workpiece electrode which if maintained would cause undue damage to the electrodes. Consequently, each discharge is terminated a short time after it is started to allow the gap to deionize. The object in electro-erosion machining is to deliver as much energy to the gap as is possible during each discharge, subject always to the fact that the gap must be enabled to deionize between discharges. Consequently, whatever frequency is being used for a particular working operation, this frequency being determined by adjusting the frequency of the pulsed output from the multivibrator, it is an essential requirement for the ON/OFF ratio of the pulsed output to be capable of adjustment between fine limits so that the duration of the individual discharges across the gap may be set to obtain optimum machining.

Figure 1:
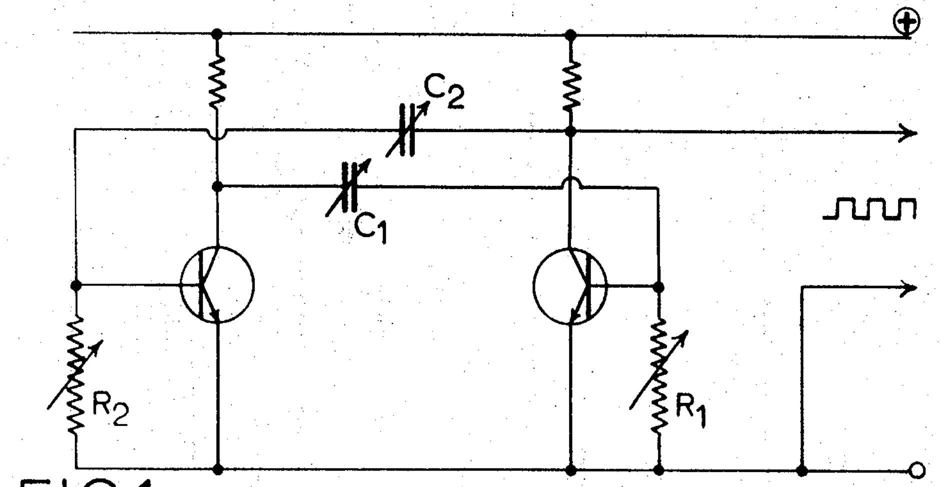
FIG. 1. PRIOR ART

A typical known a-stable multivibrator circuit using junction transistors is shown in FIG. 1 of the accompanying drawings. The operating conditions of such a circuit are well known and are described for example in Electronic Engineering, May 1956, pages 184 to 189.

In such a circuit the repetition frequency of the output pulses may be adjusted by varying the value of capacitances C1 and C2. Other methods involve alteration of the output wave form. The two capacitors must be altered simultaneously and this can only conveniently be done by switching. Hence the frequency cannot be made continuously variable.

In such a circuit the ON/OFF ratio of the output pulse may be adjusted independently of the frequency by variation of the resistances $R_1$, $R_2$.

Figure 1A:
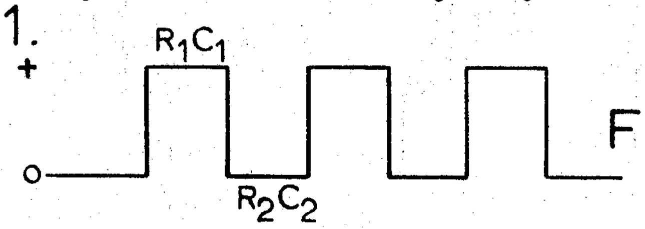
FIG. 1A. PRIOR ART

Hence as shown in FIG. 1A the output pulses may be arranged to have an ON period dependent upon $R_1C_1$ and an OFF period dependent upon $R_2C_2$.

However, as variation of capacitance can only be accomplished conveniently by switching, in discrete steps, and as $R_1$ and $R_2$ have finite resistance, the possible variation of ON/OFF ratio is limited. Moreover, the maximum value of $R_1$ and $R_2$ is limited, since if the resistance is made too large an excessive impedance will be presented to the base of the associated transistor with the result that the transistor will be slow in going to the OFF condition entailing undesirable modification of the wave form of the output pulses.

It is now generally understood that control of the ON/OFF ratio of the working discharges in an electro-erosion machine is the most important factor in determining surface finish, electrode wear and overcut, that is to say, the amount by which given dimensions reproduced in the workpiece exceed corresponding dimensions of the tool electrode.

In particular, and from the machine operators viewpoint, having once decided that for a particular machining operation, optimum results can be achieved with the individual discharges being given a specific duration, the requirement is that the interval between discharges should be as short as possible commensurate with deionization being accomplished. If then, the OFF time can be adjusted with fine limits and reduced to the minimum commensurate with adquate deionization, the optimum machining frequency will have been achieved for that specific discharge duration. Moreover, it will be seen that if the ON and the OFF, referring to the individual spark discharges are adjustable independently of one another and are each infinitely variable between wide limits, variation of repetition frequency is entailed thereby, and there is no necessity for switching of capacitance in discrete steps as called for in practice in the conventional multivibrator circuit shown in FIG. 1.

Accordingly, with the object of providing augmented control of the discharge pulses, the present invention provides electro-erosion apparatus in which the pulsed discharges are generated by a multivibrator circuit incorporating a pair of transistors, the collector of each being cross-coupled by way of a capacitance with the base of the other transistor and each transistor having associated with it an adjustable resistance, said resistance being coupled to the base electrode of its associated transistor by means of an impedance buffer in the form of a fold effect transistor.

The two adjustable resistances are adjustable independently of one another and suitably each is constituted by a rheostat so as to be infinitely variable between the maximum and minimum ohmic values of which the device is capable.

The electro-erosion apparatus according to the invention preferably further includes means for sensing and giving indication when continuous current flow is experienced at the working gap.

Figure 2:
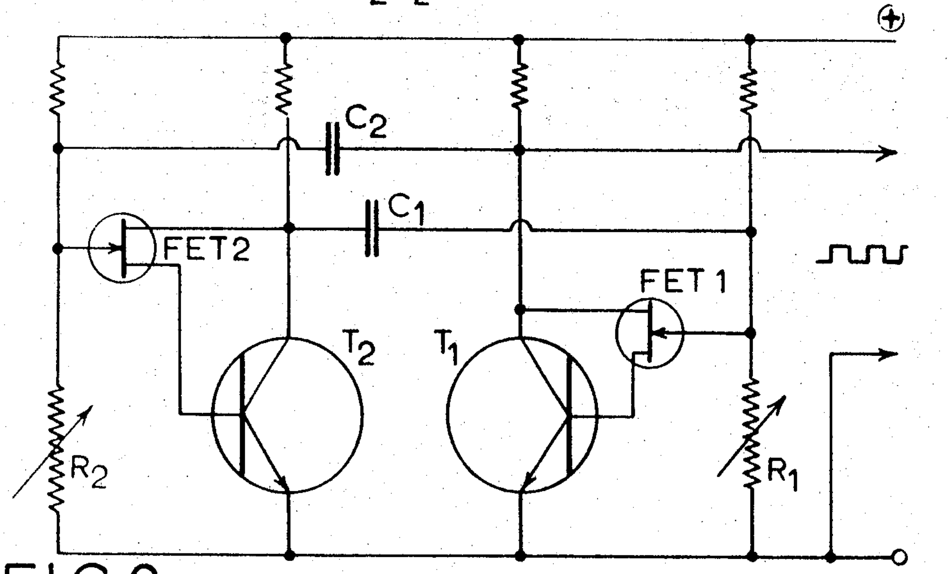

A preferred embodiment of multivibrator circuit is shown in FIG. 2 of the accompanying drawings.

In this circuit the collector of transistor T1 is cross coupled by way of capacitor C2 to the base of transistor T2. Similarly, the collector of transistor T2 is cross coupled by way of capacitor C1 to the base of transistor T1.

Each transistor T1 and T2 respectively has associated with it an adjustable resistance R1 and R2 respectively and each said resistance is coupled to the base of its associated transistor by means of an impedance buffer in the form of a field effect transistor FET 1 and FET 2 respectively.

Each field effect transistor presents a high impedance to its associated CR circuit and a low impedance to the base of its associated transistor enabling R1 and R2 to have substantially greater maximum ohmic resistance in this circuit than is possible, without undesirable modification of the waveform of the output pulses, with the conventional circuit arrangement shown in FIG. 1.

With the circuit arrangement of FIG. 2, it is possible by varying one of the adjustable resistances to control the ON period of the output pulses over a range of 1000:1 for instance so as to have a duration at the shortest of 2 microseconds and at the longest of 2000 microseconds or an infinite number of settings between these two extremes where a continuously variable device such as a rheostat is employed as the adjustable resistance. By varying the other resistance a similar degree of continuously variable control may be obtained for the duration of the OFF periods of the output pulses.

Figure 2A:
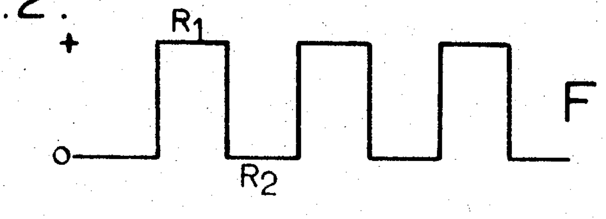

In practice and assuming R1 may be adjusted to vary the duration of the ON periods of the output pulses and R2 adjusted to vary the duration of the OFF periods as indicated in FIG. 2*a*, R1 will be set to give a predetermined duration for the discharges across the gap which is most suitable for the particular machining operation being presently undertaken. For example, if extremely fine surface finishing is required a very short discharge duration will be most suitable while if metal removal is to proceed at a faster rate it is necessary to remove large quantities of material from the workpiece during the individual discharges, and hence more energy is needed during each discharge entailing a longer duration. R2 is then adjusted to reduce the duration of the OFF periods of the output pulses and hence of the periods between the discharges at the gap available to permit deionization of the gap. R2 is continuously variable and hence the interval between discharges can be adjusted to very fine limits. When the interval between discharges is brought below that in which deionization can take place, instability will result as a continuous arc will bridge the gap. Devices for detecting this are well known and may be employed to indicate when arcing commences, whereafter R2 may be adjusted finely to increase the OFF period to the point where adequate deionization time is allowed. This setting will provide the maximum number of discharges of the particular set duration to be performed per unit time.

From the above it will be seen that the range of control which is continuously variable between the maximum and minimum values to which R1 and R2 respectively may be adjusted, is particularly suitable for electro-erosion machines and renders finer adjustment to achieve optimum machining under various working conditions than is possible where control is provided of frequency and ON/OFF ratio. Moreover, the control of the duration of the ON periods and of the OFF periods independently of one another as provided for by the present invention, simplifies the operation of electro-erosion machinery from the viewpoint of the machine operator for whom the duration of the working discharges is the most important factor in determining removal rates, surface finish, overcut and electrode wear, under the various operating conditions experienced in practice with these machines.

I claim:

1. Electro-erosion apparatus in which the pulsed discharges are generated by a multivibrator circuit incorporating a pair of transistors, the collector of each transistor being cross coupled by way of a capacitance with the base of the other transistor and each transistor having associated with it an adjustable resistance, each said adjustable resistance being coupled to the base electrode of its associated transistor by means of an impedance buffer in the form of a field effect transistor, whereby said adjustable resistances may be varied to present an augmented range of ohmic values without undesirable modification of the waveform of the output pulses.

2. Electro-erosion apparatus according to claim 1 wherein the said adjustable resistances are adjustable independently of one another.

3. Electro-erosion apparatus according to claim 2 wherein each said adjustable resistance is constituted by a rheostat.

4. Electro-erosion apparatus according to claim 1 wherein the ON duration of the output pulses is variable in dependence solely upon the ohmic value presented by one of said adjustable resistances after adjustment thereof while the OFF duration of the output pulses is variable in dependence solely upon the ohmic value of the other of said adjustable resistances after adjustment thereof.

5. Electro-erosion apparatus according to claim 4 wherein the apparatus includes means for sensing and indicating a condition of arcing between the tool electrode and workpiece electrode.

References Cited

UNITED STATES PATENTS 3,277,337 10/1966 Webb.

RALPH F. STAUBLY, Primary Examiner